United States Patent [19]

Aldag et al.

[11] Patent Number: 4,814,256
[45] Date of Patent: Mar. 21, 1989

[54] OPTICAL RECORDING MATERIAL

[75] Inventors: Reinhard Aldag, Ludwigshafen; Peter Neumann, Wiesloch, both of Fed. Rep. of Germany

[73] Assignee: BASF Aktiengesellschaft, Ludwigshafen, Fed. Rep. of Germany

[21] Appl. No.: 69,231

[22] Filed: Jul. 2, 1987

[30] Foreign Application Priority Data

Jul. 3, 1986 [DE] Fed. Rep. of Germany ....... 3622294

[51] Int. Cl.$^4$ .......................... G11B 7/24; B41M 5/26; G01D 9/00; G03C 1/72
[52] U.S. Cl. .................................. 430/270; 430/495; 430/945; 346/135.1; 540/121; 540/122; 540/128; 540/135; 540/136; 540/137; 540/139; 540/140
[58] Field of Search ............... 430/945, 495, 270, 944; 346/135.1

[56] References Cited

U.S. PATENT DOCUMENTS

| | | |
|---|---|---|
| 4,097,895 | 6/1978 | Spong . |
| 4,219,826 | 8/1980 | Bloom et al. . |
| 4,241,355 | 12/1980 | Bloom et al. . |
| 4,242,689 | 12/1980 | Bloom et al. . |
| 4,298,975 | 11/1981 | van der Veen et al. ............ 430/945 |
| 4,415,621 | 11/1983 | Specht et al. . |
| 4,492,750 | 1/1985 | Law et al. . |
| 4,529,688 | 7/1985 | Law et al. ............................ 430/945 |
| 4,650,742 | 3/1987 | Goto et al. . |
| 4,719,613 | 1/1988 | Hirose et al. ........................ 430/495 |
| 4,725,525 | 2/1988 | Kenney et al. ...................... 430/270 |

FOREIGN PATENT DOCUMENTS 0084729 8/1983 European Pat. Off. .

OTHER PUBLICATIONS

"Journal of General Chemistry", vol. 46, 1976, Mikhalenko et al., pp. 1557–1559.
J. Chem. Soc. (C), 1970, pp. 175–178; Blackburn et al.: Preparation and Photochemistry of Some Tetrazaporphins.
J. Gen. Chem., USSR, vol. 43, 1973, pp. 2010–2014, Marinina et al., Phthalocyanines and Allied Compounds.

Primary Examiner—Paul R. Michl
Assistant Examiner—Mark R. Buscher
Attorney, Agent, or Firm—Oblon, Fisher, Spivak, McClelland & Maier

[57] ABSTRACT

An optical recording material possesses a light-absorbing layer on a base, the said layer containing one or more colorants of the formula (I)

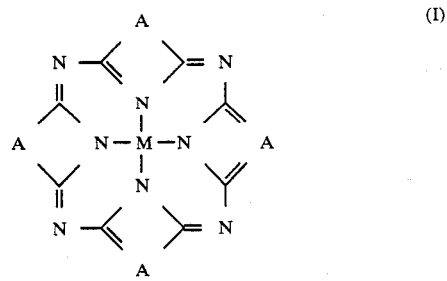

where M is two hydrogen atoms or Fe, Cu, Co, Ni, Pb, Cr, Mn, VO, TiO, ZrO, Nb, Ta, Pd, SiCl$_2$, Sn or SnX$_2$, X is Cl, Br or I, and A is a divalent radical of an unsaturated, unsubstituted or substituted carbocyclic ring system.

The colorants (I) present on the novel recording materials have a high absorption in the range from 650 to 850 nm and accordingly can be written on and read by means of a laser. The colorants can be applied as 20–1000 nm layers on a suitable base by vapor deposition or as a solution or dispersion, with or without the addition of a polymeric binder, by a conventional method.

The layers are very stable to atmospheric influences and daylight.

5 Claims, No Drawings

OPTICAL RECORDING MATERIAL

Optical recording media/recording materials for storing data are known. Data are recorded by means of light of a certain wavelength and intensity or other suitable high-energy radiation. Absorption of the radiation causes localized heating at the irradiated point. Depending on the type of layer, the dye can be caused to change color or can be destroyed (decolorized). Depressions can be produced in the surface of the medium, at the irradiated point, as a result of evaporation, softening and/or melting. When the medium is scanned, a change in the intensity of the reflected light occurs at the recorded points.

U.S. Pat. No. 4,097,895 describes a recording medium which has a layer of light-reflecting material, eg. aluminum or gold, on a base. The said layer is covered with a light-absorbing layer, eg. fluorescein. This recording medium can be written on and read by means of an argon laser. The thickness of the light-absorbing layer is chosen so that the structure has minimal reflectance. An incident light beam detaches the absorbing layer, evaporates it or melts it, so that a hole is produced in which the light-reflecting layer is exposed. After the recording process, there is a difference between the minimum reflectance of the light-absorbing layer and the higher reflectance of the light-reflecting layer for the intensity of the light used. If the light-reflecting material is applied as a thin layer on a substrate of low thermal conductivity, the energy loss both during reflection at the thin absorbing layer and as a result of the slight heat conduction in the reflecting layer is very small. Thus, the energy absorbed from the light beam is concentrated on the very thin film.

Storage media in which other light-absorbing materials are used are also based on a similar principle.

U.S. Pat. No. 4,242,689 discloses a recording medium which contains diindenoperylene as the light-absorbing layer. This medium can be written on using an argon laser.

U.S. Pat. No. 4,415,621 describes cyanine dyes which, in the form of thin layers, can be written on using a laser of wavelength 488 nm.

EP-A No. 84 729 and U.S. Pat. No. 4,492,750 furthermore disclose, for example, the use of phthalocyanine compounds and of naphthalocyanine compounds as light-absorbing agents in recording materials.

Materials intended for use as a light-absorbing layer of the recording medium ust be applied on a suitable base, in the form of a thin, smooth layer of high optical quality and predetermined thickness. The materials must furthermore have a high absorption at the wavelength of the light source used, so that the recording materials have a very high sensitivity and hence a high recording rate, ie. the recording materials must change their optical properties in the irradiated area in one of the ways described above when exposed to light pulses having a focal diameter of less than about 1 $\mu$m and energies in the nanojoule range or lower.

Preferred light sources are pulsed semiconductor lasers which operate in the range from 750 to 850 nm and are compact in design.

The light-absorbing layers which are known to be useful in this spectral range (eg. German Laid-Open Application DOS No. 2,951,341 or U.S. Pat. No. 4,241,355) are applied to the base by, for example, vapor deposition under greatly reduced pressure.

Some of these vapor deposition methods require very high temperatures which subject the material being vaporized and the base to stress and, owing to impurities produced by spray or particles thrown up from the evaporation boat, may furthermore be considered problematic.

In contrast, the use of dye solutions or dispersions for the production of light-absorbing layers has a number of advantages: solutions and dispersions are dust-free and can be prepared in high purity, and coating may be carried out under normal pressure and temperature conditions.

It is an object of the present invention to provide optical recording material which have light-absorbing layers, meet these requirements and are easy to prepare, stable over a long period, corrosion-free and non-toxic. Moreover, these recording materials should be capable of being written on and read by means of lasers, in particular semiconductor lasers.

We have found that this object is achieved, and that optical recording materials which can be written on and read very readily by means of a semiconductor laser and consist of a base and a light-absorbing layer are obtained, if the said recording materials contain a light-absorbing layer which contains one or more colorants of the formula (I)

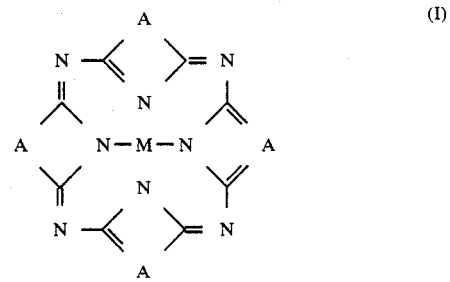

where M is two hydrogen atoms or Fe, Cu, Co, Ni, Cr, Mn, Pb, VO, TiO, ZrO, Nb, Ta, Pd, SiCl$_2$Sn or SnX$_2$, X is Cl, Br or I, and A is a radical of a divalent unsaturated, unsubstituted or substituted carboxylic ring system.

The colorants (I) used as a light-absorbing layer for the novel recording materials have a high absorption at the wavelength of the laser used, ie. about 600–850 nm. The colorants can be applied to a reflective or nonreflective surface of a glass or plastic substrate in such a way that smooth absorption layers of high optical quality are formed.

Because of the high absorption of the dyes (I), the novel recording materials are very sensitive to the light of semiconductor lasers and are therefore suitable for storing and releasing information with a high signal/-noise ratio. The layers are very stable to atmospheric influences and daylight. The colorants used are non-toxic.

The colorants (dyes) of the formula (I) present in the novel recording materials are preferably those in which M is VO, TiO, ZrO, Pb, Mn, Cu, Co or Sn.

Particularly preferred dyes (I) are those in which M is Co, TiO, ZrO, Mn or Pb.

Examples of suitable divalent radicals A of unsaturated and unsubstituted or substituted carbocyclic ring systems are those which are derived from stilbene, phenanthrene, substituted benzene or triphenylene. The ring systems A convert the compounds (I) to a completely conjugated system.

Specific examples of divalent radicals A are:

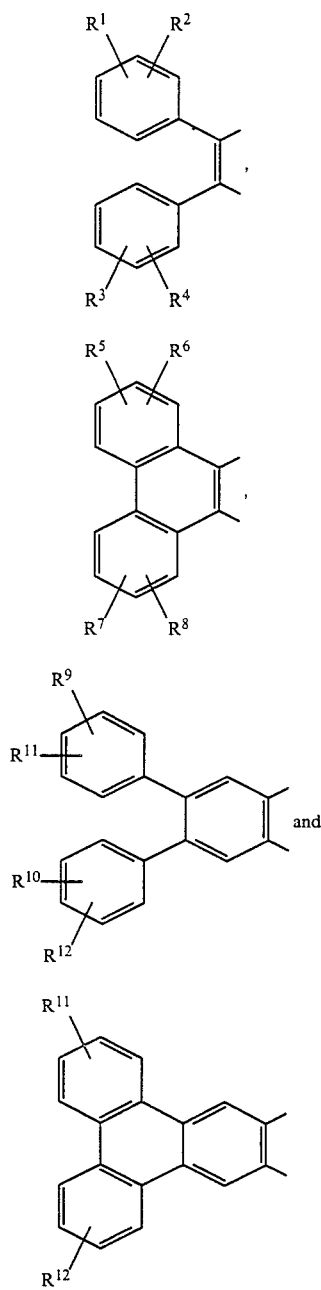

In formulae (II) to (V), $R^1$ to $R^{12}$ have the meanings given below.

$R^1$ to $R^8$ independently of one another are each hydrogen, $C_1$–$C_{12}$-alkyl, trifluoromethyl, $C_1$–$C_{12}$-alkylthio, phenoxy, phenylthio, fluorine, chlorine, bromine, nitro, amino, mono-$C_1$–$C_{12}$-alkylamino, di-$C_1$–$C_{12}$-alkylamino, —$SiR_3$ or —$SnR_3$, where R is $C_1$–$C_8$-alkyl, and $R^9$, $R^{10}$, $R^{11}$ and $R^{12}$ independently of one another are each hydrogen, $C_1$–$C_{12}$-alkyl, unsubstituted or alkoxy-substituted aryl (where aryl is preferably phenyl), $C_1$–$C_{12}$-alkoxy, fluorine, chlorine, bromine, amino, mono-$C_1$–$C_{12}$-alkylamino or di-$C_1$–$C_{12}$-alkylamino.

Preferred dyes (I) are those in which A is (1) a radical of the formula II, where $R^1$, $R^2$, $R^3$ and $R^4$ are in the 3- and 4- and 3'- and 4'-position, (2) a radical of the formula III, where $R^5$, $R^6$, $R^7$ and $R^8$ are in the 2-, 3-, 6- and 7-position, (3) a radical of the formula IV, where $R^9$, $R^{10}$, $R^{11}$ and $R^{12}$ are in the m- or p-position and (4) a radical of the formula V, where $R^{11}$ and $R^{12}$ are in the 1-, 4-, 6-, 7-, 10- or 11-position.

Particularly noteworthy dyes are those of the formulae VI to IX, in which $R^1$ or $R^{12}$ have the meanings stated in Tables 1 to 4.

TABLE 1

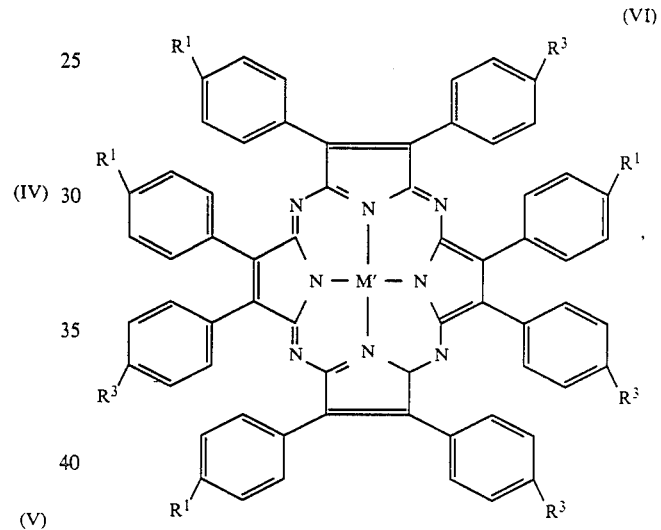

| Compound | | M' | $R^1$ | $R^3$ |
|---|---|---|---|---|
| VI. | 1 | VO | H | H |
| VI. | 2 | VO | $t$-$C_4H_9$ | $t$-$C_4H_9$ |
| VI. | 3 | TiO | H | H |
| VI. | 4 | TiO | $t$-$C_4H_9$ | $t$-$C_4H_9$ |
| VI. | 5 | Mn | H | H |
| VI. | 6 | Mn | $t$-$C_4H_9$ | $t$-$C_4H_9$ |
| VI. | 7 | Pb | H | H |
| VI. | 8 | Pb | $t$-$C_4H_9$ | $t$-$C_4H_9$ |
| VI. | 9 | VO | O—$C_4H_9$ | O—$C_4H_9$ |
| VI. | 10 | Mn | O—$C_4H_9$ | O—$C_4H_9$ |
| VI. | 11 | VO | $N(CH_3)_2$ | $N(CH_3)_2$ |
| VI. | 12 | Mn | $N(CH_3)_2$ | $N(CH_3)_2$ |
| VI. | 13 | VO | $N(C_4H_9)_2$ | $N(C_4H_9)_2$ |
| VI. | 14 | Mn | $N(C_4H_9)_2$ | $N(C_4H_9)_2$ |

TABLE 2

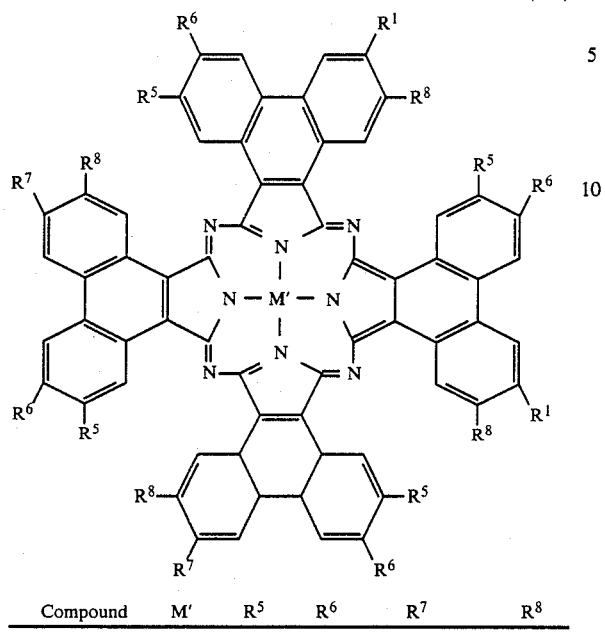

(VII)

| Compound | | M' | R⁵ | R⁶ | R⁷ | R⁸ |
|---|---|---|---|---|---|---|
| VII. | 1 | VO | H | H | H | H |
| VII. | 2 | VO | H | t-C₄H₉ | t-C₄H₉ | H |
| VII. | 3 | TiO | H | H | H | H |
| VII. | 4 | TiO | H | t-C₄H₉ | t-C₄H₉ | H |
| VII. | 5 | Mn | H | H | H | H |
| VII. | 6 | Mn | H | t-C₄H₉ | t-C₄H₉ | H |
| VII. | 7 | Pb | H | H | H | H |
| VII. | 8 | Pb | H | t-C₄H₉ | t-C₄H₉ | H |
| VII. | 9 | VO | C₄H₉ | C₄H₉O | C₄H₉ | H |
| VII. | 10 | Mn | C₄H₉ | C₄H₉O | C₄H₉ | H |
| VII. | 11 | VO | H | (C₄H₉)₂N | (C₄H₉)₂N | H |
| VII. | 12 | Mn | H | (C₄H₉)₂N | (C₄H₉)₂N | H |
| VII. | 13 | Pb | H | (C₄H₉)₂N | (C₄H₉)₂N | H |

TABLE 3

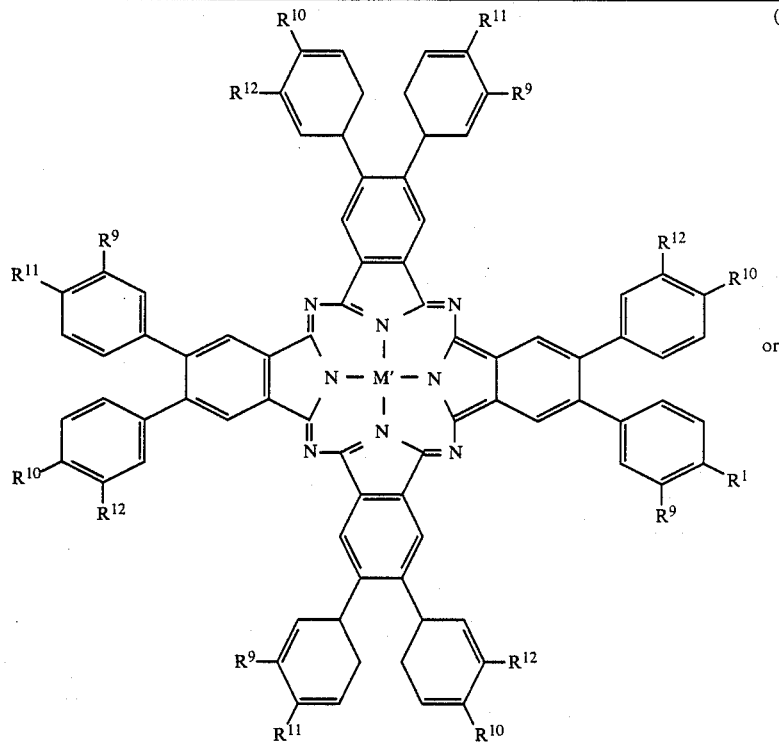

(VIII)

or

| Compound | | M' | R¹² | R¹⁰ | R¹¹ | R⁹ |
|---|---|---|---|---|---|---|
| VIII | 1 | VO | H | H | H | H |
| VIII | 2 | Mn | H | t-C₄H₉ | t-C₄H₉ | H |
| VIII | 3 | Pb | H | H | H | H |
| VIII | 4 | TiO | H | t-C₄H₉ | t-C₄H₉ | H |
| VIII | 5 | TiO | H | H | H | H |
| VIII | 6 | VO | H | t-C₄H₉ | t-C₄H₉ | H |
| VIII | 7 | Mn | H | H | H | H |
| VIII | 8 | Pb | H | t-C₄H₉ | t-C₄H₉ | H |
| VIII | 9 | VO | C₂H₅O | C₂H₅O | C₂H₅O | C₂H₅O |
| VIII | 10 | Mn | C₂H₅O | C₂H₅O | C₂H₅O | C₂H₅O |
| VIII | 11 | VO | H | C₅H₁₁O | C₅H₁₁O | H |
| VIII | 12 | Mn | H | C₅H₁₁O | C₅H₁₁O | H |

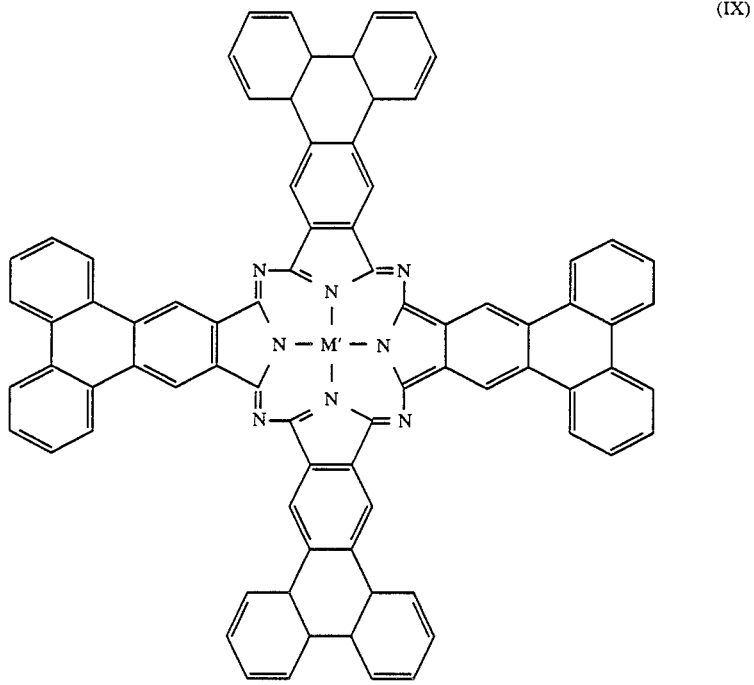

(IX)

M' =
VO
Mn
Pb
TiO

The preparation of the colorants is known or can be carried out by a conventional method. Phenanthrocyanines are described in, for example, J. Chem. Soc. Ser. C, 1970, 175, and phenylphorphyrazines in J. Gen. Chem. USSR, 43 (1973), 2010.

The novel dyes which are substituted derivatives of the parent compounds are soluble in conventional organic solvents. In the case of the unsubstituted pigment-like phorphyrazines, ultrafine dispersions having particle sizes of <0.1 μm are used.

The structures of the recording materials are known per se. Suitable bases are sheets or disks of glass or plastic, in particular polymethyl methacrylate (PMMA), polycarbonate (PC) or polystyrene (PS).

A reflective layer may be present underneath the light-absorbing layer. The unabsorbed part of the incident light is then reflected and once again passes through the colored layer.

The prior art (Bell, Spong; IEEE J. of Quantum Electronics Vol. QE-14 (1978), 7, page 490; RCA-Reviews 40 (1979), page 345) states that it is advantageous if, in these cases, the dye layer has a thickness of λ/4 (λ=wavelength of the incident light), since interference effects cause additional attenuation of the incident light. However, we have found that very sensitive recording media are also obtained using layer thicknesses substantially less than λ/4.

The composition and thickness of the reflector layer should be such that the said layer reflects as completely as possible the light used for recording and reading. Low thermal conductivity is advantageous for achieving high recording sensitivity.

The base or the light-reflecting layer must have an optically smooth, even surface, which must be such that the absorbing layer adheres to it.

Examples of suitable light-reflecting materials are aluminum, rhodium, gold, tin, lead, bismuth, copper and dielectric mirrors. Coating with these materials is carried out by vapor deposition under reduced pressure.

A reflector layer may be dispensed with.

Exposure may also be effected through the transparent base. In this case, the sequence of layers is substrate/absorber layer/reflector. To improve the signal, an intermediate layer can, if desired, be applied between the substrate and the reflector. SiO, SiO$_2$, MgF$_2$, Al$_2$O$_3$ and mixtures of these as well as organic plastic materials are suitable for this layer.

The dyes (I) can be applied by spin-coating, knife-coating or immersion, using the dye dissolved or dispersed in organic solvents. If required, these solvents may contain binders. Metallic reflecting layers are applied by vapor deposition or sputtering under reduced pressure.

Depending on the composition of the system, the dye is applied first, followed by the reflecting layer, or vice versa. The application of a reflecting layer may be dispensed with.

To apply the dye-containing layers from a solution or dispersion, a solution or a dispersion is prepared in a suitable solvent, such as methylene chloride, chloroform, acetone, methyl ethyl ketone, cyclohexanone, toluene, acetonitrile, ethyl acetate or methanol, and, if required, a binder is added. Suitable binders are radiation-curable or heat-curable resins, for example photopolymers, silicone resins and epoxy resins or thermoplastics.

Thermoplastics which have very little or no crystallinity and a glass transition temperature of >35° C., in particular >75° C., are preferred. It is also advantageous for homogeneous layers if the binders, such as resins or thermoplastics, are readily compatible with the novel dyes. Examples of suitable binders are water-insoluble binders having a high dissolving powder for the novel dyes, eg. (meth)acrylate polymers and copolymers, polystyrene homopolymers and copolymers, polyvinylcarbazole, polyvinyl heteropolymers, polyvinyl chloride and cellulose esters.

The preparation applied to a previously cleaned substrate by spin-coating, knife-coating or immersion is then dried in the air.

In the case of the preferred spin-coating method, the dye preparation is applied to the disk and the latter is rotated at speeds of from 200 to 2000 rpm. During this procedure, the solution spreads over the disk and forms a solid layer after the solvent has evaporated. The thickness of the layer is dependent on several factors and can be varied and reproducibly adjusted by changing the speed of rotation, the solvent, the dye concentration in the solvent and/or the binder.

The Examples which follow illustrate the invention.

EXAMPLE 1

(a) A solution of 0.1 g of the dye VI. 6 in 15 ml of methyl ethyl ketone was prepared and was applied to a PMMA disk by centrifuging. After drying in the air and then at room temperature under reduced pressure, a uniform film about 500 nm thick and without pinholes was obtained. An aluminum reflector layer about 30 nm thick was applied to this dye layer by vapor deposition under reduced pressure.

(b) The resulting recording medium rotating at 800 rpm was exposed through the substrate to light pulses of a laser suitable for information recording and having an intensity of 5 mW and a pulse duration of 20 nsec, the radiation being focused to a diameter of 1.0 μm. The incident energy of 0.1 nJ per pulse was sufficient to produce, per pulse, a hole of 1–1.3 μm diameter.

For playback, an unmodulated semiconductor laser beam focused in the same manner and attenuated to 1 mW by means of a filter was passed over the recorded points of the recording material, and the light reflected by the material was measured using a photodetector. With the aid of the photodetector, it was found that reflection at a point previously recorded differs substantially from that at a point which has not been written on.

EXAMPLES 2 TO 7

A solution or an ultrafine dispersion of the dye in methyl ethyl ketone was applied to PMMA disks by spin-coating and was dried, after which the dye layer was coated with aluminum by vapor deposition, these steps being carried out similarly to Example 1. The dyes below were used.

TABLE 4

| Example | Dye of the formula | Thickness of the recording layer (nm) |
|---|---|---|
| 2 | VI. 2 | 50 |
| 3 | VI. 9 | 60 |
| 4 | VI. 14 | 60 |
| 5 | VII. 6 | 50 |
| 6 | VII. 10 | 65 |
| 7 | VIII. 9 | 80 |

EXAMPLE 8

Aluminum was applied as a 50 nm thick reflector layer on a glass base by vapor deposition under reduced pressure. A solution of 0.1 g of dye VII. 6 and 0.2 g of PMMA in 15 ml of methyl ethyl ketone was applied to the reflective glass base by spin-coating, and the dye layer was dried first in the air and then under reduced pressure at room temperature. A layer about 75 nm thick was obtained.

Using a suitable laser having an energy of 0.1 nJ, it was possible to record signals in the layer, similarly to Example 1.

EXAMPLE 9

Tin was applied as a 60 nm thick reflector layer on a polycarbonate base by vapor deposition under reduced pressure. A dispersin of 0.1 g of dye IX (M=VO) and 0.02 g of PMMA in 20 ml of methyl ethyl ketone was applied to the reflective base, and the dye layer was dried first in the art and then under reduced pressure at room temperature. A layer about 75 mm thick was obtained.

Using a laser having an energy of about 1.2 nJ, it was possible to record signals in the layer, similarly to Example 1.

We claim:

1. An optical recording material capable of being written on and read by means of a laser, which consists of a base and a light-absorbing layer and in which the said layer contains one or more colorants of the formula

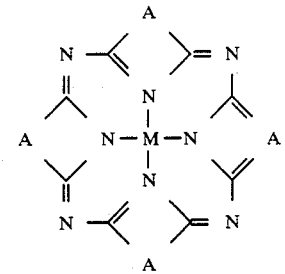

where M is two hydrogen atoms, or Fe, Cu, Co, Ni, Cr, Mn, Pb, VO, TiO, ZrO, Nb, Ta, Pd, SiCl$_2$, Sn or SNX$_2$, X is Cl, Br or I, and A is a radical of the formula

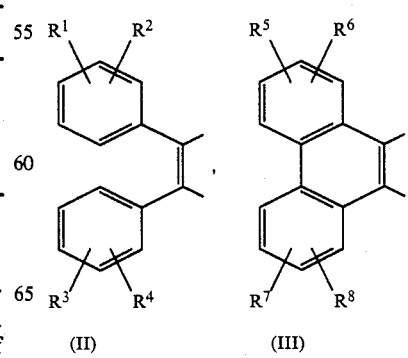

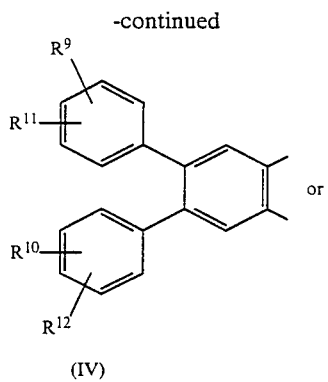

(IV)

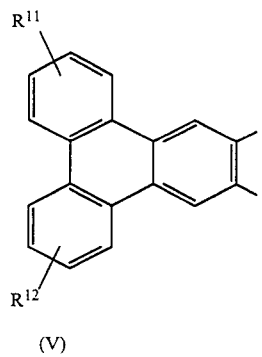

(V)

where $R^1$ to $R^8$ independently of one another are each hydrogen, $C_1$–$C_{12}$-alkyl, trifluoromethyl, $C_1$–$C_{12}$-alkylthio, phenoxy, phenylthio, fluorine, chlorine, bromine, nitro, amino, mono-$C_1$–$C_{12}$-alkylamino, di-$C_1$–$C_{12}$-alkylamino, —$SiR_3$ or —$SnR_3$, where R is $C_1$–$C_8$-alkyl, and $R^9$, $R^{10}$, $R^{11}$ and $R^{12}$ independently of one another are each hydrogen, $C_1$–$C_{12}$-alkyl, unsubstituted or alkoxy-substituted phenyl, $C_1$–$C_{12}$-alkoxy, fluorine, chlorine, bromine, amino, mono-$C_1$–$C_{12}$-alkylamino or di-$C_1$–$C_{12}$-alkylamino.

2. An optical recording material as claimed in claim 1, wherein M is VO, TiO, ZrO, Pb, Mn, Co, Cu or Sn.

3. An optical recording material as claimed in claim 1, wherein the substituents $R^1$, $R^2$, $R^3$ and $R^4$ in (II) are in positions 3, 4, 3' and 4', the substituents $R^5$, $R^6$, $R^7$ and $R^8$ in (III) are in positions 2, 3, 6 and 7, the substituents $R^9$, $R^{10}$, $R^{11}$ and $R^{12}$ in (IV) are in positions 3, 4, 3' and 4' and $R^{11}$ and $R^{12}$ in (V) can be in positions 1, 4, 6, 7, 10 or 11.

4. An optical recording material as claimed in claim 2, wherein the substituents $R^1$, $R^2$, $R^3$ and $R^4$ in (II) are in positions 3, 4, 3' and 4', the substituents $R^5$, $R^6$, $R^7$ and $R^8$ in (III) are in positions 2, 3, 6 and 7, the substituents $R^9$, $R^{10}$, $R^{11}$ and $R^{12}$ in (IV) are in positions 3, 4, 3' and 4', and $R^{11}$ and $R^{12}$ in (V) can be positions 1, 4, 6, 7, 10 or 11.

5. An optical recording material capable of being written on and read by means of a laser, which consists of a base and a light-absorbing layer and in which the said layer contains one or more colorants of the formula

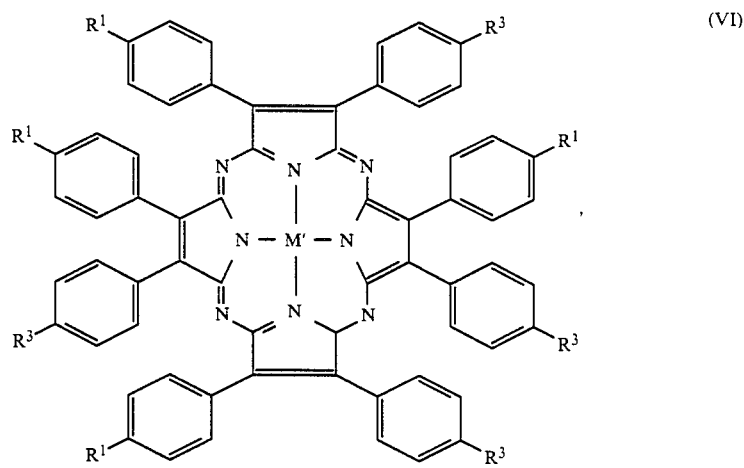

(VI)

-continued
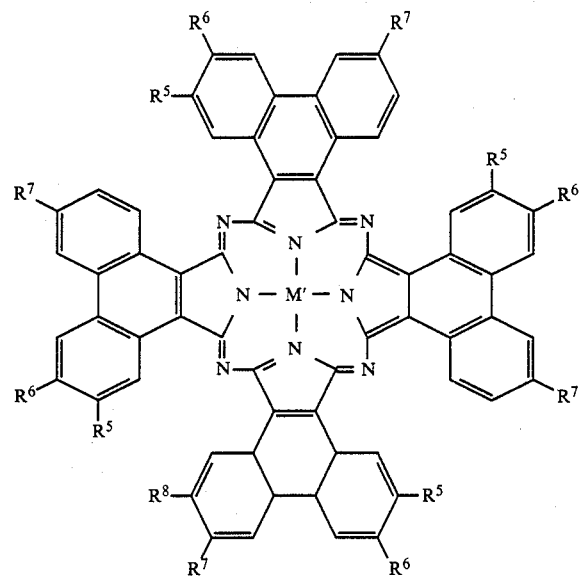
(VII)
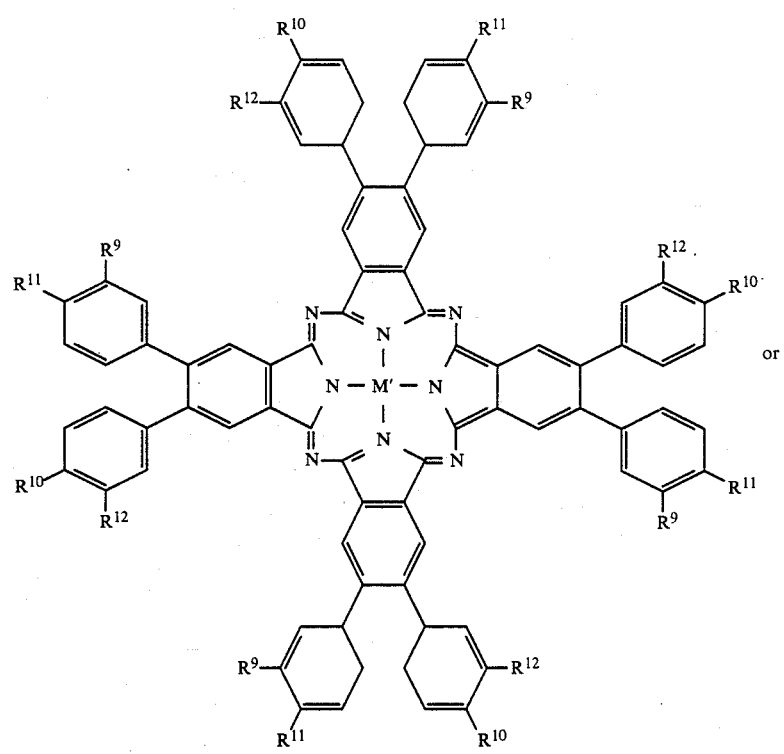
(VIII)
or

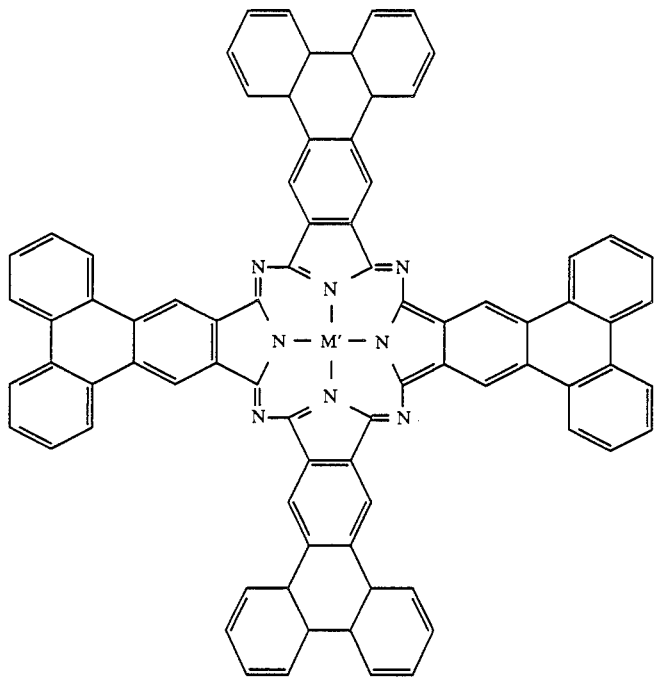
(IX)
where M' is VO, TiO, Mn or Pb, $R^1$ and $R^3$ are each hydrogen, butyl, butoxy, dimethylamino or dibutylamino, $R^5$ is hydrogen or butyl, $R^6$ and $R^7$ are each hydrogen, butyl, butoxy or dibutylamino, $R^9$ and $R^{12}$ are each hydrogen or ethoxy and $R^{10}$ and $R^{11}$ are each hydrogen, butyl, ethoxy or pentyloxy.
* * * * *